UNITED STATES PATENT OFFICE.

JOHN CHESTER, OF SALTAIRE, ENGLAND.

PROCESS FOR PRODUCING COLORS ON TEXTILE AND OTHER MATERIALS.

1,231,492.

Specification of Letters Patent.

Patented June 26, 1917.

No Drawing.

Application filed November 24, 1915. Serial No. 63,305.

*To all whom it may concern:*

Be it known that I, JOHN CHESTER, a subject of the King of Great Britain, residing at Moorhead Cottage, Saltaire, Yorkshire, England, have invented certain new and useful Improvements in a Process for Producing Colors on Textile and other Materials; and I do hereby declare the following to be a full, clear, and exact description of the invention, such as will enable others skilled in the art to which it appertains to make and use the same.

This invention relates to a process for producing colors on textile and other materials having an animal origin, such as wool, leather, feathers, horn and the like, the object being to produce the colors economically and with as few steps as possible in the process.

Those processes having as a basis the treatment of the goods to be dyed or colored by means of nitrous acid in a first bath and then by metallic salts in a subsequent bath have only produced colors of a very fugitive nature.

Instead of using separate baths as above of which the first bath is used cold, I produce permanent colors on the materials in question by combining the substances producing the nitrous acid and the metallic salt in a single bath and by using the bath at a high temperature.

The following is an example of how the invention may be carried out:—

Wool is treated in a bath composed of:—

Sodium nitrite, 5% on weight of the material to be dyed,

Commercial sulfuric acid, 5% on weight of the material to be dyed,

Sodium bichromate, 2% on weight of the material to be dyed, the whole being dissolved in a suitable quantity of water. The material is put into the bath when the latter is cold. The bath is gradually brought to the boil. In this case a brown color is produced. As in previous processes the sodium nitrite and the sulfuric acid interact to form the necessary nitrous acid.

A variation in the metallic salt causes a variation in the color produced, for instance if copper sulfate be used a brown more reddish in character is produced than when sodium bichromate is used.

I claim:—

1. In a process of producing colors on textile and other materials having an animal origin by the use of nitrous acid and a metallic salt capable of generating a color, combining the nitrous acid and the metallic salt in a single bath with which the material is treated at a high temperature.

2. A process of producing colors on textile and other materials having an animal origin by treating the material with a bath containing nitrous acid and soluble bichromate at a high temperature.

3. A process of producing colors on textile and other materials having an animal origin by treating the material with a bath containing sodium nitrite, sulfuric acid and soluble bichromate at a high temperature.

In testimony whereof, I affix my signature.

JOHN CHESTER.